W. V. GEE.
Improvement in Machines for Winding Bobbins.

No. 125,564.  Patented April 9, 1872.

Witnesses.
Cha.? Kenyon
Villette Anderson

Inventor.
W. V. Gee,
Chipman Hosmer & Co
Attys.

W. V. GEE.
Improvement in Machines for Winding Bobbins.

No. 125,564.  Patented April 9, 1872.

Witnesses.
Chas Kenyon
Villette Anderson

Inventor:
W. V. Gee,
Chipman Hosmer & Co
Attys.

UNITED STATES PATENT OFFICE.

WILLIAM V. GEE, PHILADELPHIA, PENNSYLVANIA.

IMPROVEMENT IN MACHINES FOR WINDING BOBBINS.

Specification forming part of Letters Patent No. 125,564, dated April 9, 1872; antedated March 29, 1872.

*To all whom it may concern:*

Be it known that I, WILLIAM V. GEE, of Philadelphia, in the county of Philadelphia and State of Pennsylvania, have invented a new and valuable Improvement in Machines for Winding-Bobbins; and I do hereby declare that the following is a full, clear, and exact description of the construction and operation of the same, reference being had to the annexed drawing making a part of this specification, and to the letters and figures of reference marked thereon.

Figure 1:
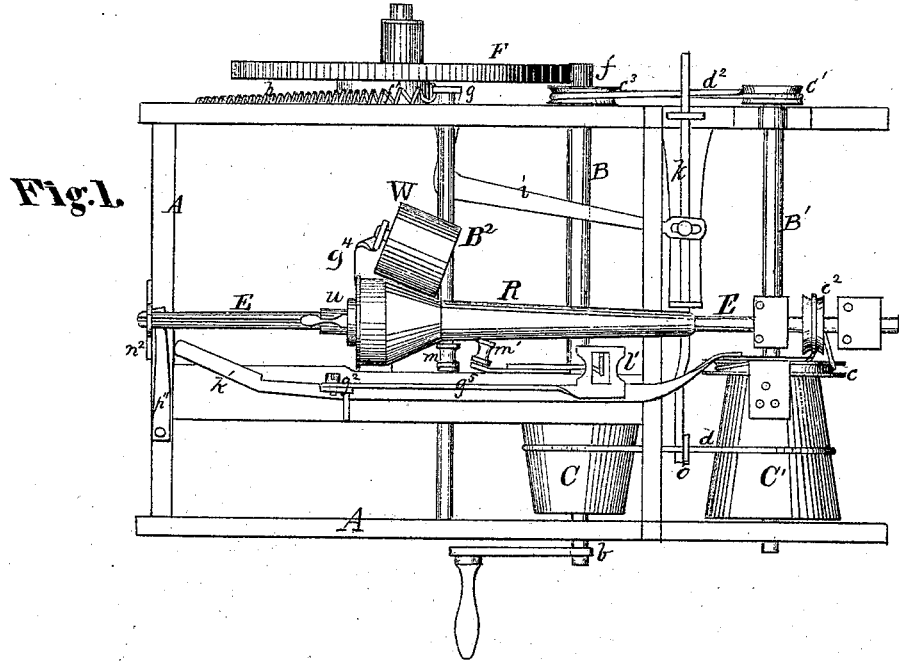
Figure 2:
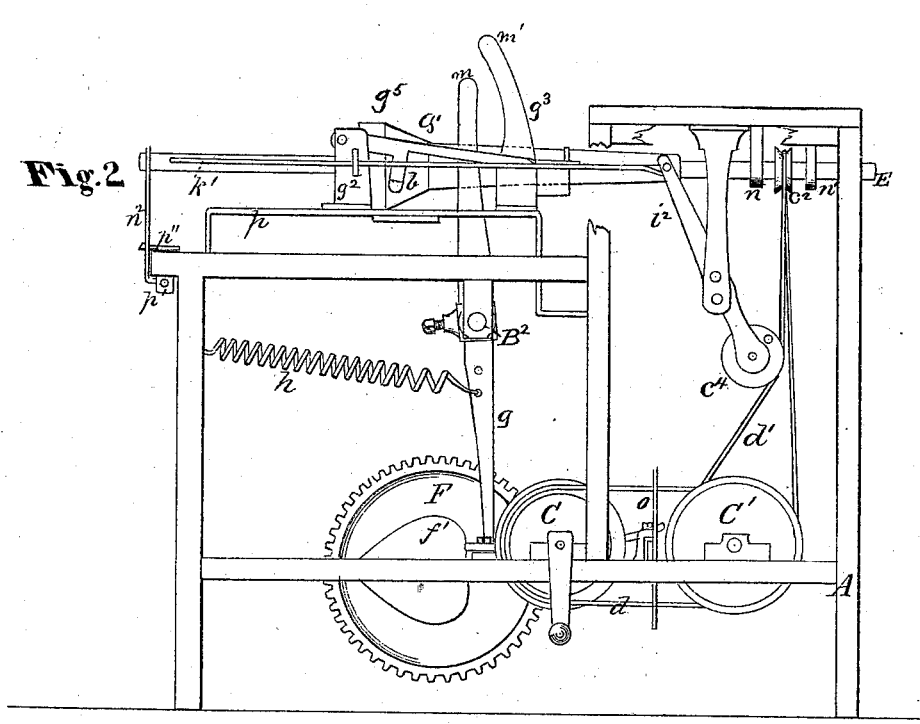
Figure 3:
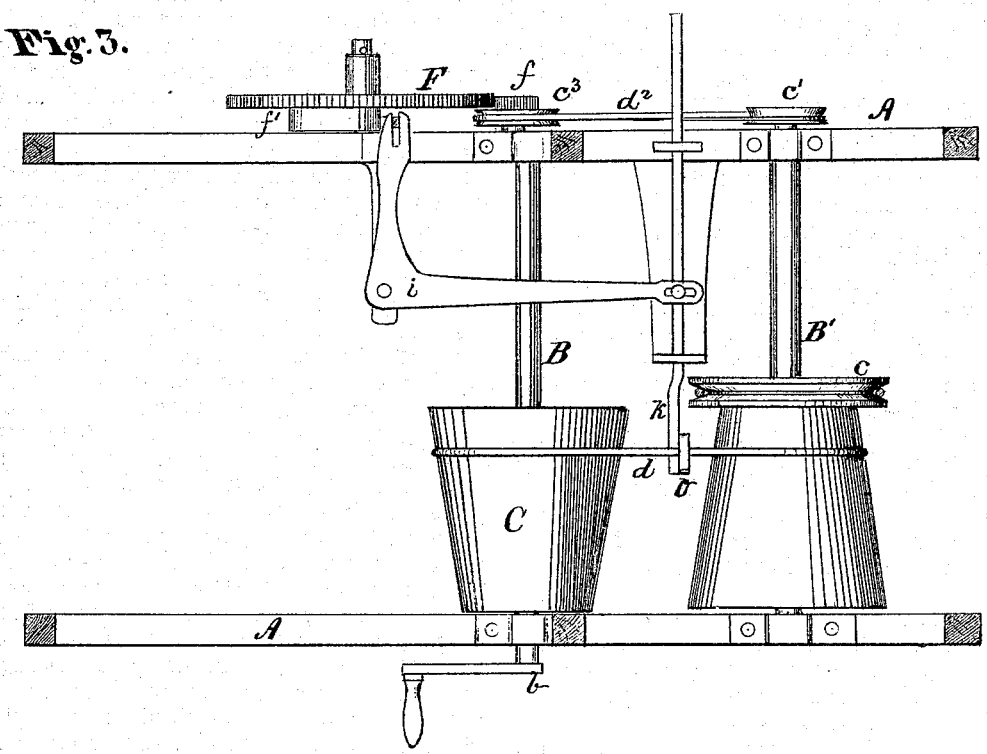

Figure 1 of the drawing is a representation of a top view of my invention with upper plate removed. Fig. 2 is a side view. Fig. 3 is a horizontal section of the same.

This invention has relation to improvements in machines for winding bobbins; and it consists in a novel combination of machinery for that purpose, hereinafter fully described. The object of the invention is to provide a machine for the automatic winding of thread on bobbins, so as to secure uniform tension and compact and tight winding of the thread throughout.

Referring to the accompanying drawing, A represents a frame suitable for the support of the machinery. B $B^1$ are driving-shafts parallel to each other, and supported in proper bearings on the frame A. Suitable provision is made on the end $b$ of the shaft B for the application of the motive power. The drums C $C'$, carried by the shafts B $B^1$, are of like dimensions and form, each being in the shape of a frustum of a cone. They are placed directly opposite to each other on the end of the shafts B $B^1$, so that the large end of the one is opposite to the small end of the other. Their circumferential surfaces are furrowed to aid in giving motion to the belt or cord $d$, which transmits motion from one to the other. The drum $C'$ has connected to its small end the pulley $c$, which carries the belt or cord $d'$ that transmits motion from the drum $C'$ to the pulley $c^2$, on the shaft E. The small pulley $c^1$ on the end of the shaft $B^1$, carries the crossed belt or cord $d^2$, which transmits reverse motion from the shaft $B^1$ to the larger pulley $c^3$. The pulley $c^3$ has a lateral bearing in the frame A, and on its other side a pinion-wheel, $f$, which transmits motion from the pulley $c^3$ to the cog-wheel F. The cog-wheel F revolves on a fixed spindle that projects from the frame A, and has on its inner side around the spindle a heart-shaped hub or eccentric, $f'$, which acts as a cam, and transmits an alternating reverse motion from the cog-wheel F to the arm $g$. The arm $g$ is fixed to the shaft $B^2$, and drawn against the eccentric $f'$ by the spring $h$. It works in the forked end of the elbowed lever $i$, which is sustained at its angle by a support projecting from the frame A. The lever $i$ transmits the alternating reverse motion from the arm $g$, by means of its slotted end and a connecting-pin to the sliding bar $k$, which is supported by guides in the frame A, and in a projection from it. The bar $k$ has on its end a double vertical slotted guide, $o$, through which the belt or cord $d$ passes, and by means of which the alternating reverse motion is transmitted from the bar $k$ to the belt $d$. The arm $g$ transmits the alternating reverse motion from the eccentric $f'$ to the shaft $B^2$, which is supported in bearings projected downward from the frame A, and which transmits a like motion to the upwardly projecting arm $g^1$, that is adjusted on the shaft $B^2$ by a collar and set-screw. The arm $g^1$ has, at its upper end, a lateral projection or boss, $m$, that serves as a guide for the thread and an aid in regulating its motion and tension, transmitting to it the alternating reverse motion from the arm $g^1$. The bent support $p$ rests at its ends upon the frame A, and has upon its upper side the fixed vertical projecting-arms $g^2$ $g^3$. The arm $g^3$ has at its upper end a lateral boss, $m'$ $m'$, to support the thread. The arm $g^2$ has near its middle a lateral horizontally slotted guide through which passes the sliding rod $k'$, notched on its side so as to catch against the edge of the arm $g^2$. The sliding rod $k'$ is free at one end for the application of the hand, and is connected at the other to the lever $i^2$, which is supported on a downwardly-projecting-arm from the frame A, by an adjustable pivot. Supported on a lateral bearing on the lower end of the lever $i^2$ is the pulley $c^4$, which presses against the belt or cord $d'$. By means of the sliding rod $k'$, lever $i^2$, and pulley $c^4$, the tension of the belt or cord $d'$ is regulated at will, so that the bobbin-shaft E may or may not be revolved. The bobbin-shaft E has its bearings at one end in two fixed supports projecting downward from the frame A, one on each side of the pulley $c^2$. From the lower end of the support $n$, a bent guard projects to prevent the belt or cord $d'$ from slipping off of the pulley $c^2$. The other end of the shaft E has its bearing in a removable support, $n^2$, which is hinged to the frame A at $p'$, and held in place or released at will, by a spring-catch, $p''$, on the frame A. The arm $g^5$ has its bearing on the upper end of the arm $g^2$, and is provided at the other end with a suitable guide, $l'$, for the thread, which passes under and over a support projected from the arm $g^3$. It is also provided with a lug, $v$, for the purpose of disengaging the sliding rod $k'$ from the arm $g^2$, so that should there be any unusual strain on the thread the arm $g^5$ will be raised, and the sliding rod $k'$ disengaged as aforesaid, and, as before shown, the motion of the bobbin stopped. The bobbin R is of the general form shown, and may be slipped on or off of the shaft E, the bearing support $n^2$ being turned down first. The clutch $u$ slides in a groove in the shaft E, and by means of lugs on its face fitting in corresponding recesses in the end of the bobbin R, the bobbin R is fixed on and takes the revolving motion of the shaft E. A revolving-plain faced pulley, W, is supported in close proximity to the bobbin R on a lateral spindle on the bent arm $g^4$ extending from the bent support $p$ so that the face of the pulley W and the face of the conical portion of the bobbin R, at their nearest line, are parallel. The pulley W serves to secure uniform and compact winding of the thread, and to press back the bobbin R on the shaft, as the thread accumulates. The pulley W may be of any desired form, as conical or cylindrical.

When the machine is in operation, the thread passes from its source around under the guide $l'$ and over the supports $m'$ $m$ to the bobbin R. The bobbin R is so placed on the shaft E, that the alternating reverse motion of the arm $g'$ causes the thread to wind with a like motion over the conical furrowed surface of the bobbin R. As the thread accumulates, the pressure upon the pulley W causes the bobbin R to slide backward toward the end of the shaft E, and thus each layer of thread is kept parallel with the first, and with the conical surface of the bobbin R. As the belt or cord $d$ moves laterally over the drums C C', the motion transmitted from the drum C to the drum C', and consequently to the bobbin R is varied. When the belt or cord $d$ is at the large end of the drum C it is at the small end of the drum C', and in consequence the motion of the drum C' and the bobbin R is most rapid, and vice versa. This varied motion of the bobbin R is necessary to secure uniform tension of the thread, as it winds over the conical surface, for the velocity of different points in a line with the length of the bobbin on the conical surface with uniform motion of the bobbin varies, being slower towards the point; and hence as the thread winds down the surface, it is necessary to increase the speed of the bobbin to compensate for this diminished velocity, and vice versa. The pulley W is set in motion by the revolving surface of the bobbin R or the thread thereon, and aids materially in producing uniform tension, and tight and compact winding of the thread, especially as the thread approaches the smallest part of the conical surface, or the point of the bobbin, which result it has been, heretofore, very difficult to attain.

I claim as my invention—

1. The combination of the pulley $c^1$ on the shaft $B^1$, belt or cord $d^2$, pulley $c^3$ having pinion $f$, cog-wheel F, having eccentric $f'$, arm $g$, having spring $h$, lever $i'$, and sliding bar $k$, having guide $o$, all constructed and arranged as and for the purposes set forth.

2. The combination of the arm $g$, having spring $h$, shaft $B^2$, arm $g^1$, arm $g^3$, arm $g^5$, having lug $v$ and guide $l'$, sliding rod $k'$, lever $i^2$, and pulley $c^4$, all constructed and arranged as and for the purposes set forth.

3. The combination of the pulley $c^1$ on the drum C', belt or cord $d'$, pulley $c^2$, shaft E, hinged support $n^2$, clutch $u$, bobbin R, and pulley W, all constructed and arranged as and for the purposes set forth.

In testimony that I claim the above I have hereunto subscribed my name in the presence of two witnesses.

W. V. GEE.

Witnesses:
 WM. NEILL,
 WM. F. PRATT.